United States Patent
Haulk et al.

(10) Patent No.: US 6,885,287 B2
(45) Date of Patent: Apr. 26, 2005

(54) METHODS AND APPARATUS FOR AUTOMATICALLY LOCATING AN ELECTRONIC SHELF LABEL

(75) Inventors: Kevin W. Haulk, Griffin, GA (US); Cheryl K. Harkins, Lawrenceville, GA (US)

(73) Assignee: NCR Corporation, Dayton, OH (US)

( * ) Notice: Subject to any disclaimer, the term of this patent is extended or adjusted under 35 U.S.C. 154(b) by 416 days.

(21) Appl. No.: 10/044,439

(22) Filed: Jan. 11, 2002

(65) Prior Publication Data

US 2003/0132833 A1 Jul. 17, 2003

(51) Int. Cl.[7] .......................... G06F 7/08; G06F 17/60; H04Q 9/00; G08B 5/22
(52) U.S. Cl. .................... 340/5.91; 705/16; 705/20; 705/26; 370/314; 370/348
(58) Field of Search ................ 340/5.91, 10.3, 340/825.49; 705/16, 20, 26; 370/314, 348

(56) References Cited

U.S. PATENT DOCUMENTS

| | | | | |
|---|---|---|---|---|
| 5,241,691 A | * | 8/1993 | Owen | ......................... 455/517 |
| 6,046,682 A | * | 4/2000 | Zimmerman et al. | .. 340/825.49 |
| 2004/0012485 A1 | * | 1/2004 | Sundqvist | .................. 340/5.91 |

* cited by examiner

*Primary Examiner*—Michael Horabik
*Assistant Examiner*—Scott Au
(74) *Attorney, Agent, or Firm*—Priest & Goldstein, PLLC

(57) ABSTRACT

An electronic price label (ESL) system with communication error correction is described. In one aspect, the ESL system automatically locates an ESL after the ESL fails to respond to a message. After a number of retries to the ESL have gone unanswered, the host computer system causes all CBSs to transmit an automatic find for the ESL which is not responding. This automatic find is transmitted by all the CBSs on all timeslots. Alternatively, the find can be transmitted by one CBS or a group of CBSs in a predetermined pattern calculated to quickly find the ESL failing to respond. If the ESL responds to the automatic find command, the host computer system logs which CBS heard the response and which timeslot the ESL responded on.

20 Claims, 5 Drawing Sheets

METHODS AND APPARATUS FOR AUTOMATICALLY LOCATING AN ELECTRONIC SHELF LABEL

FIELD OF THE INVENTION

The present invention relates generally to improvements in electronic shelf label (ESL) systems used in transaction establishments. More specifically, the present invention relates to improvements in methods and apparatus for automatically locating an ESL after the ESL fails to respond to a message.

BACKGROUND OF THE INVENTION

ESL systems typically include a plurality of ESLs for each merchandise item in a store. ESLs display the price of corresponding merchandise items on store shelves and are typically attached to a rail along the leading edge of the shelves. A store may contain thousands of ESLs to display the prices of the merchandise items. The ESLs are coupled to a central server where information about the ESLs is typically maintained in an ESL data file which contains ESL identification information and ESL merchandise item information. The central server sends messages, including register update messages, to the ESLs utilizing communication base stations (CBSs).

While prior ESL systems provide many of the capabilities required by retailers, these systems may suffer from various disadvantages. For example, while communication between the central server and the ESLs is quite reliable, if the ESL has been moved from its assigned location the ESL may not be able to receive a message from the particular CBS which transmits messages to the ESL. Additionally, if the ESL has not been assigned a correct timeslot, the ESL may not be listening for messages at the appropriate time. Such situations effectively sever communication between the ESL and its associated CBS until the ESL can be found and corrective action taken. Therefore, it would be desirable to provide a system and method that automatically locates ESLs which are not responding to messages by determining a CBS near the ESL and determining a timeslot on which the ESL can communicate.

SUMMARY OF THE INVENTION

The present invention advantageously provides methods and apparatus for an improved electronic shelf label (ESL) system. The present invention provides an automatic find function which attempts to locate an ESL which is not responding to messages. After a number of retries to the ESL have gone unanswered, the host computer system causes all CBSs to transmit an automatic find on all timeslots directed to the ESL which is not responding. If the ESL responds to the automatic find command, the host computer system logs which CBS heard the response and which timeslot the ESL responded on.

A more complete understanding of the present invention, as well as further features and advantages of the invention, will be apparent from the following detailed description and the accompanying drawings.

DETAILED DESCRIPTION

The present invention now will be described more fully with reference to the accompanying drawings, in which several presently preferred embodiments of the invention are shown. This invention may, however, be embodied in various forms and should not be construed as limited to the embodiments set forth herein. Rather, these embodiments are provided so that this disclosure will be thorough and complete, and will fully convey the scope of the invention to those skilled in the art.

Further details of an ESL system suitable for use in conjunction with the present invention are found in U.S. patent application Ser. No. 10/044,021 filed Jan. 11, 2002 entitled "Methods and Apparatus for Performing Delta Updates of an Electronic Shelf Label", U.S. patent application Ser. No. 10/044,610 filed Jan. 11, 2002 entitled "Methods and Apparatus for Intelligent Data Bedcheck of an Electronic Shelf Label", U.S. patent application Ser. No. 10/044,020 filed Jan. 11, 2002 entitled "Methods and Apparatus for Reduced Electronic Shelf Label Power Consumption", now U.S. Pat. No. 6,626,359 issued Sep. 30, 2003, U.S. patent application Ser. No. 10/044,535 filed Jan. 11, 2002 entitled "Methods and Apparatus for Error Detection and Correction of an Electronic Shelf Label System Communication Error", U.S. patent application Ser. No. 10/044,440 filed Jan. 11, 2002 entitled "Methods and Apparatus for Conserving Battery Power in an Electronic Shelf Label System", U.S. patent application Ser. No. 10/044,688 filed Jan. 11, 2002 entitled "Methods and Apparatus for Automatic Assignment of a Communication Base Station and Timeslot for an Electronic Shelf Label", U.S. patent application Ser. No. 10/044,687 filed Jan. 11, 2002 entitled "Methods and Apparatus for Error Detection and Correction in an Electronic Shelf Label System", all of which are assigned to the assignee of the present invention and incorporated by reference herein in their entirety.

Figure 1:
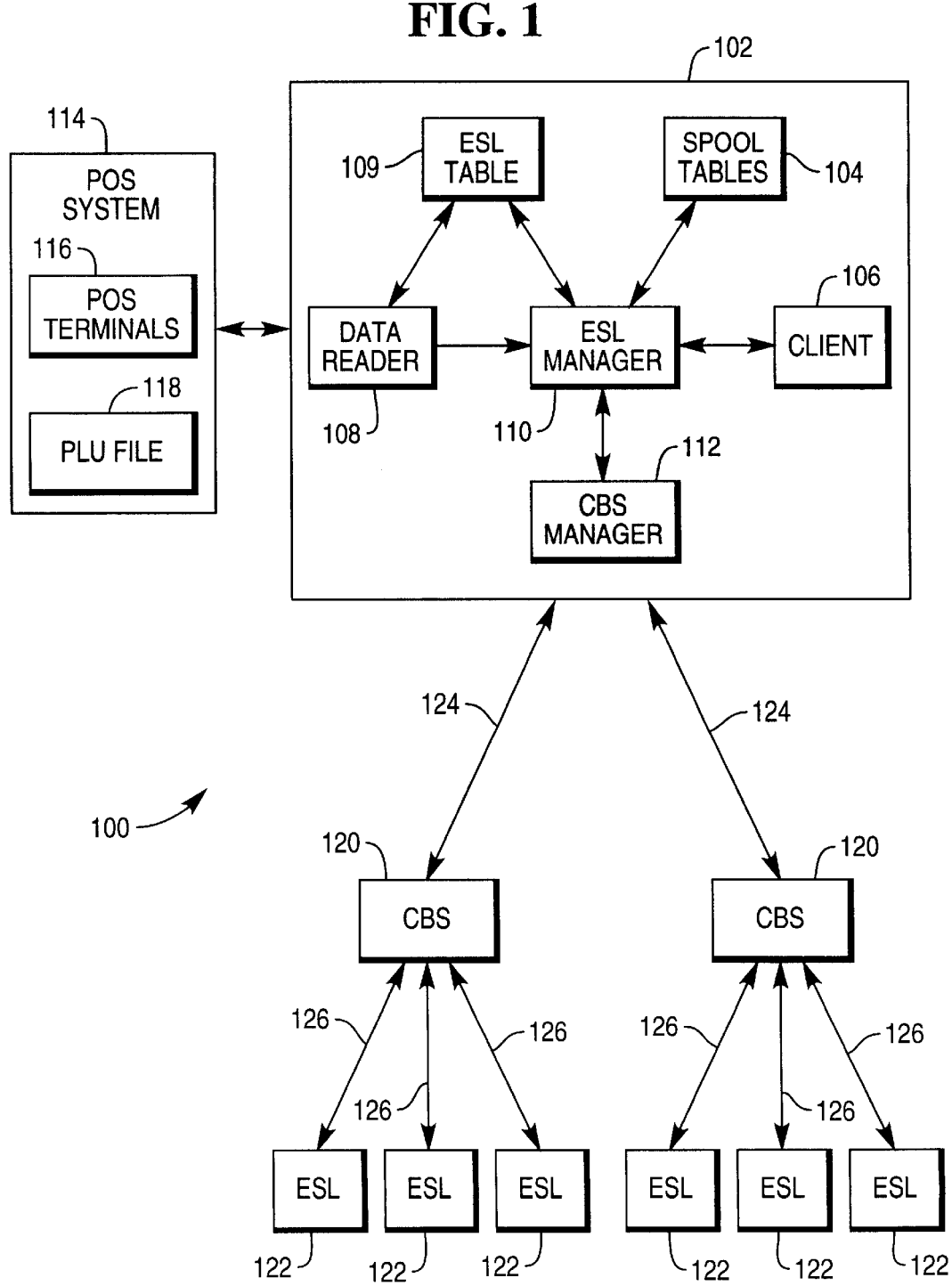
FIG. 1 shows a block diagram of a transaction management system in accordance with the present invention.

FIG. 1 shows a transaction management system 100 in accordance with the present invention. The system 100 includes an ESL computer system 102 and a point-of-sale (POS) system 114. Here, components 102 and 114 are shown as separate components that are networked together, but they and their subcomponents may also be combined or divided in various ways.

The host computer system 102 includes an ESL table 109, spool tables 104, data reader 108, ESL manager 110, a client application 106 and a communication base station (CBS) manager 112. POS system 114 includes a price look-up (PLU) file 118 and POS terminals 116.

The system 100 also includes CBSs 120 and ESLs 122. The CBSs 120 may be suitably mounted in or near the ceiling of the retail establishment. ESLs 122 are typically attached to store shelving adjacent to items. In one aspect, the system 100 includes a plurality of groups of ESLs 122 and a plurality of CBSs 120, with each group of ESLs 122 assigned to one the CBSs 120.

The ESL manager 110 records and schedules messages to the ESLs 122. The ESL manager 110 monitors and maintains an action list for the ESLs 122 utlizing spool tables 104, and provides a scheduling function for time related events which need to occur at a future point at time. Items on the action list may be provided from client components as requests for work, may be automatically generated by the ESL manager 110, or could be due to requests that required additional processing at a later date, such as, for example, a series of sale prices to be represented at the tags at given times. Based on the events the ESL manager 110 has scheduled for an ESL 122, the ESL manager 110 creates the appropriate request and sends the request to the CBS manager 112. The requests may include register or memory updates of an ESL 122, diagnostic requests such as bedchecks, location requests such as finds, assignments to a particular timeslot, and the like. Based on the response returned from the ESL 122 via the CBS Manager 120, the ESL Manager 112 then updates the ESL table 109 and spool tables 104 as appropriate. Such updates may include marking a particular task as completed, updating the data image of the ESL 122, and the like. A client application, such as client application 106, may interface with the ESL manager 110 to initiate requests for a particular activity. The data reader 108 provides an interface from the ESL manager 110 to the POS system 114.

The CBS manager 112 is responsible for all communications, processing, and monitoring of the CBSs. The CBS manager 112 receives information intended to be transmitted to the ESLs 122 and processes it into a form appropriate for use by the CBSs 120 and ESLs 122. The CBS manager 112 processes the response of a particular ESL 122 after a CBS 120 has received that response and then passed that response to the CBS manager 112. Additionally, the CBS manager 112 monitors the CBSs 120 for problems, performs diagnostics on the CBSs 120 and logs errors.

The messages are sent to the CBSs 120 through communication links 124. The communication links 124 may suitably utilize radio frequency (RF) communication, infrared (IR) communication, a wired link, or some combination of communication techniques. Groups of ESLs 122 are assigned to a particular CBS for communication. After receiving a message from the host system 102, a particular CBS 120 which has been assigned to an ESL 122 then transmits the message to the ESL 122 utilizing communication link 126, which may suitably utilize RF communication, IR communication, or some combination of communication techniques.

After receiving a message, the ESLs 122 transmit a response to CBSs 120 over communication links 126. The CBSs 120 would then process and retransmit the response message to the CBS manager 112 over communication links 124. The CBSs 120 may also detect the signal strength of the response and report the signal strength to the host computer system 102.

The ESL data file 109 consists of multiple records, with each record corresponding to a particular ESL 122 in a retail establishment. The record for each ESL 122 includes a number of fields, with each field containing the data which is supposed or assumed to be in one of the registers of the ESL 122. Thus, the record contains a picture, or full data image, of what data is intended to be stored in the ESL 122, and consequently, what the ESL 122 should be displaying on the ESL's display. Additionally, each record may include a variety of additional non-display information related to the ESL 122, such as the timeslot the ESL 122 listens on, the CBS 120 assigned to the ESL 122, and the PLU number of the item associated with the ESL 122. The record may also contain diagnostic and tally information related to that ESL 122, such as when the last time a message was sent to the ESL 122, the last time the ESL 122 had a data bedcheck, a count of how many times the ESL 122 has failed its data bedcheck, and the like.

Figure 2:
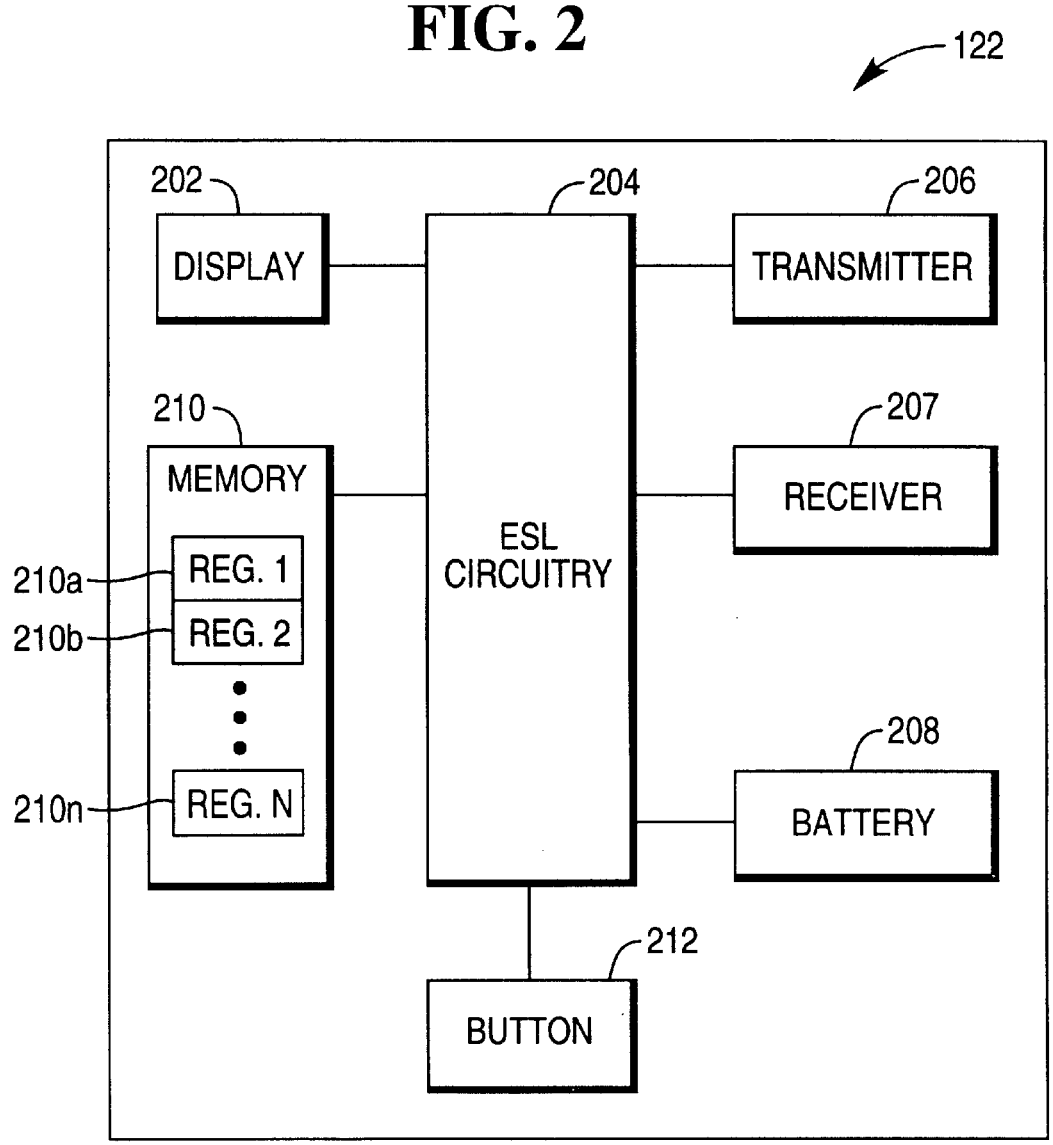
FIG. 2 is a block diagram of an ESL in accordance with the present invention.

FIG. 2 shows a block diagram of an exemplary ESL 122 in accordance with the present invention. A display 202 displays information, such as item price and related data. ESL 122 includes a transmitter 206 for transmitting messages and a receiver 207 for receiving messages. The transmitter 206 and receiver 207 may utilize RF communication, IR communication, a wired link or some combination of communication techniques. A battery 208 provides power for the operation of ESL 122. The operation of ESL 122 is controlled by ESL circuitry 204. ESL circuitry 204 decodes incoming messages received, and performs any actions indicated by the messages. For example, if a register update message is received, the ESL circuitry 204 would cause the appropriate register to be updated with the data. ESL memory 210 includes a plurality of registers, such as registers $210a, 210b, \ldots, 210n$. The ESL memory 210 may contain many types of information. For example, the memory 210 may include display registers which contain the actual text to be displayed by the ESL 122. This text may include item price, informative or promotional text, text directed to store employees, and the like. Other registers may contain data which controls various parameters related to the display of the text, such as display register selection and timing sequences, for example. The ESL 122 may also include a button 212 which may be depressed to initiate a particular function, such as, for example, the display of an alternate message.

As described above, each ESL 122 is associated with a particular CBS 120 which transmits messages to the ESL 122 and listens for responses. Each CBS 120 in a retail establishment transmits messages to and receives responses from groups of ESLs 122 assigned to a particular CBS 120. In a preferred embodiment, communication between the CBSs 120 and the ESLs 122 is divided into frames, with each frame being 1.45 seconds. Each frame is further divided into 24 timeslots, with each timeslot being 60.42 milliseconds. In addition to being associated with a particular CBS 120, each ESL 122 is associated with a particular timeslot and listens for messages and transmits responses during that timeslot only. Each CBS 120 may suitably support two timeslots for the transmission and reception of messages during normal operation.

Figure 3A:
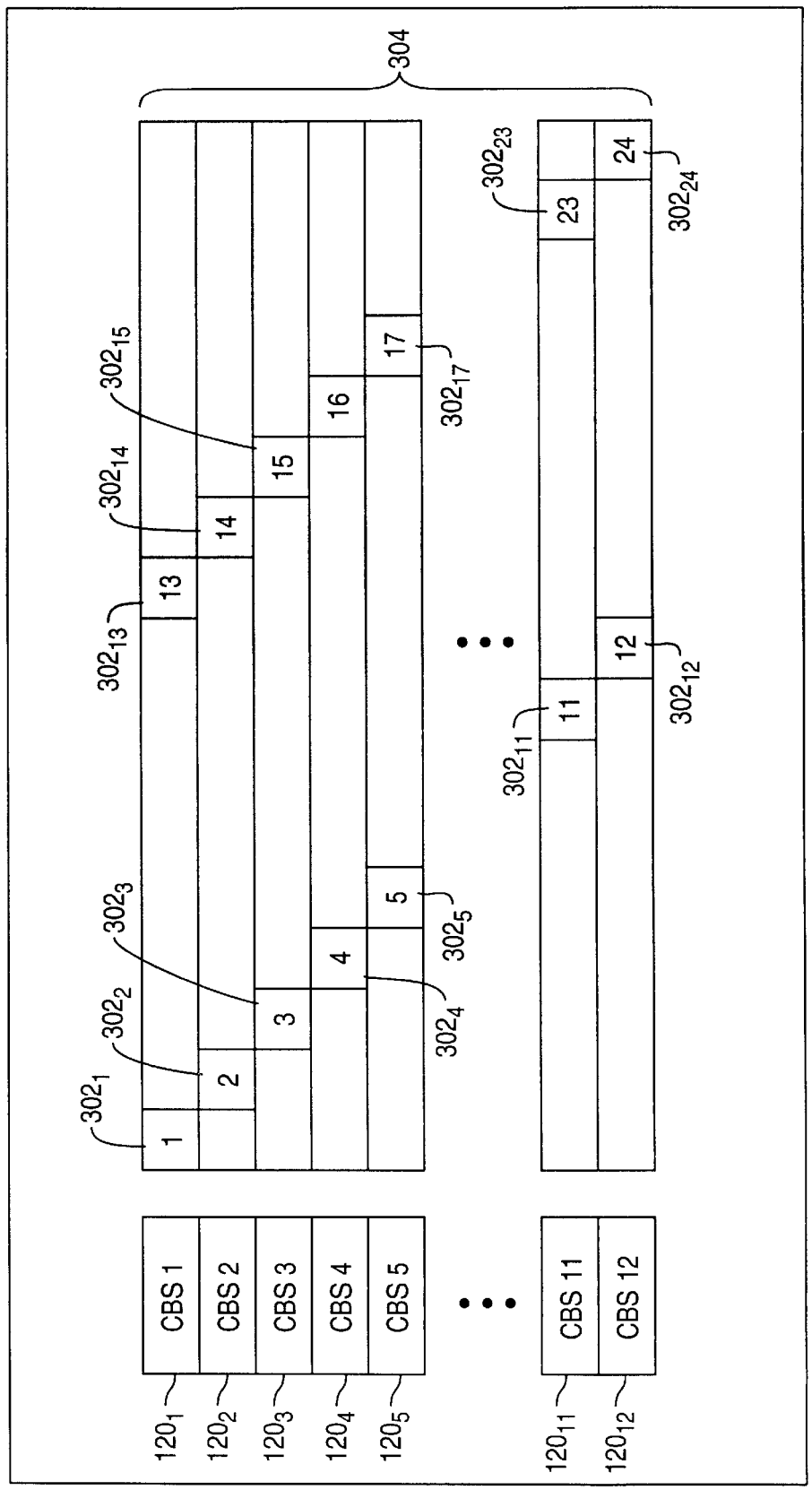
FIG. 3A shows an exemplary frame and timeslot assignment in accordance with the present invention.
Figure 3B:
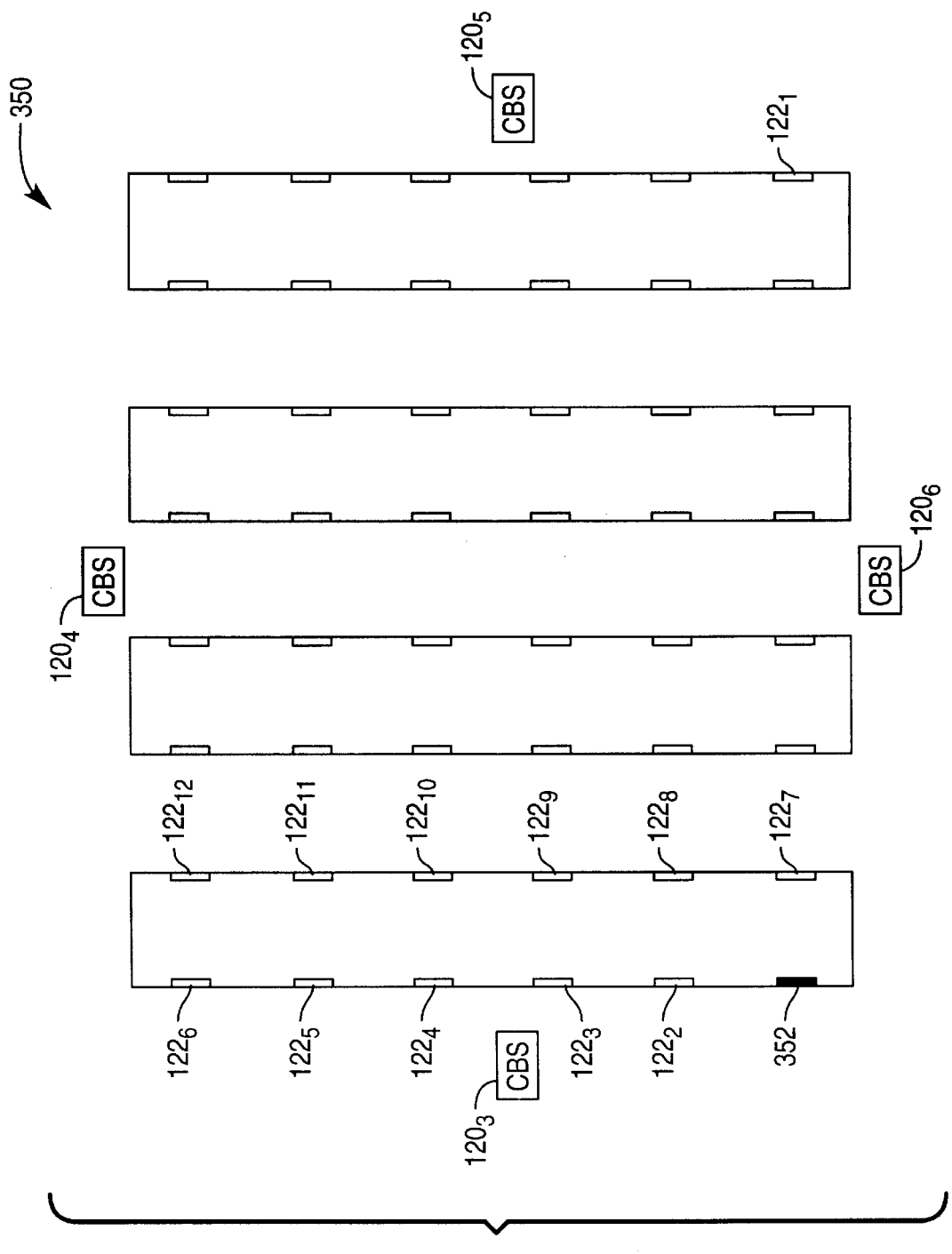
FIG. 3B shows a portion of a retail establishment in accordance with the present invention.

FIG. 3A shows an exemplary timing diagram 300 for a system employing twelve CBSs $120_1, 120_2, 120_3, \ldots, 120_{11}, 120_{12}$ showing timeslots $302_1, 302_2, 302_3, \ldots, 302_{23}, 302_{24}$ for a frame 304. As seen in FIG. 3, the CBS $120_4$, for example, is assigned to the timeslot $302_4$ and the timeslot $302_{16}$. Thus, if a particular ESL 122 has been assigned to the CBS $120_4$ and the timeslot $302_{16}$, that ESL 122 will receive messages from and transmit responses to the CBS $120_4$ only during the timeslot $302_{16}$. While the example shown in FIG. 3A utilizes twelve CBSs, a higher or lower number of CBSs may be employed in accordance with the teachings of the present invention.

In certain situations, an ESL may not be able to communicate with its assigned CBS. For example, as seen in the simplified floor diagram 350 of FIG. 3B which shows a portion of a retail establishment, assume that ESLs $122_1, 122_2, 122_3, \ldots, 122_{11}, 122_{12}$ are assigned to communicate with the CBS $120_3$, and that the ESL $122_1$ has been assigned to communicate utilizing the timeslot $302_3$. Initially the ESL $122_1$ was located on a shelf in slot 352 adjacent to the ESL $122_2$, and was in communication range of its assigned CBS $120_3$. The ESL $122_1$ was then moved to another location outside the communication range of the CBS $120_3$, but within the communication range of CBS $120_5$. Such a movement may occur due to, for example, the relocation of the product associated with the ESL $122_1$, as retail establishments periodically rearrange their product placement to optimize sale opportunities. Any messages transmitted by the CBS $120_3$ will not be received by the ESL $122_1$. Alternatively, the ESL $122_1$ may not have been assigned to the correct timeslot or to the correct CBS $120_3$, due to, for example, having factory preset conditions which are not appropriate to actual store conditions. The present invention provides an automatic find function which attempts to locate the ESL $122_1$ which is not responding to messages from its assigned CBS $120_3$. After a number of retries to the ESL $122_1$ have gone unanswered, the host computer system 102 causes all CBSs 120 to transmit an automatic find on all timeslots directed to the ESL $122_1$ which is not responding. If the ESL $122_1$ responds to the automatic find command, the host computer system 102 logs which CBS 120 heard the response and which timeslot the ESL responded on. In the system shown in FIG. 3B, the CBS $120_5$ will report that a response from the ESL $122_1$ was received on the timeslot $302_3$. In one aspect of the present invention, if the response is heard by more than one CBS 120, such as CBS $120_5$ and CBS $120_6$, the host computer 102 logs the CBS 120 which received the strongest response signal.

In an alternative embodiment, the host computer may only use a subset of the CBSs 120 to search a particular area of the store where the missing ESL 122 is likely to be located. The search could then progress to other areas of the store if the missing ESL 122 is not initially found. One CBS after another CBS, or groups of CBSs, may issue the find in a predetermined pattern calculated to quickly find the ESL 122 failing to respond. For example, the find could be initially be transmitted by CBSs closest to where the missing ESL 122 is expected to be, and if the ESL 122 is not found, then working outward in a predetermined pattern.

Figure 4:
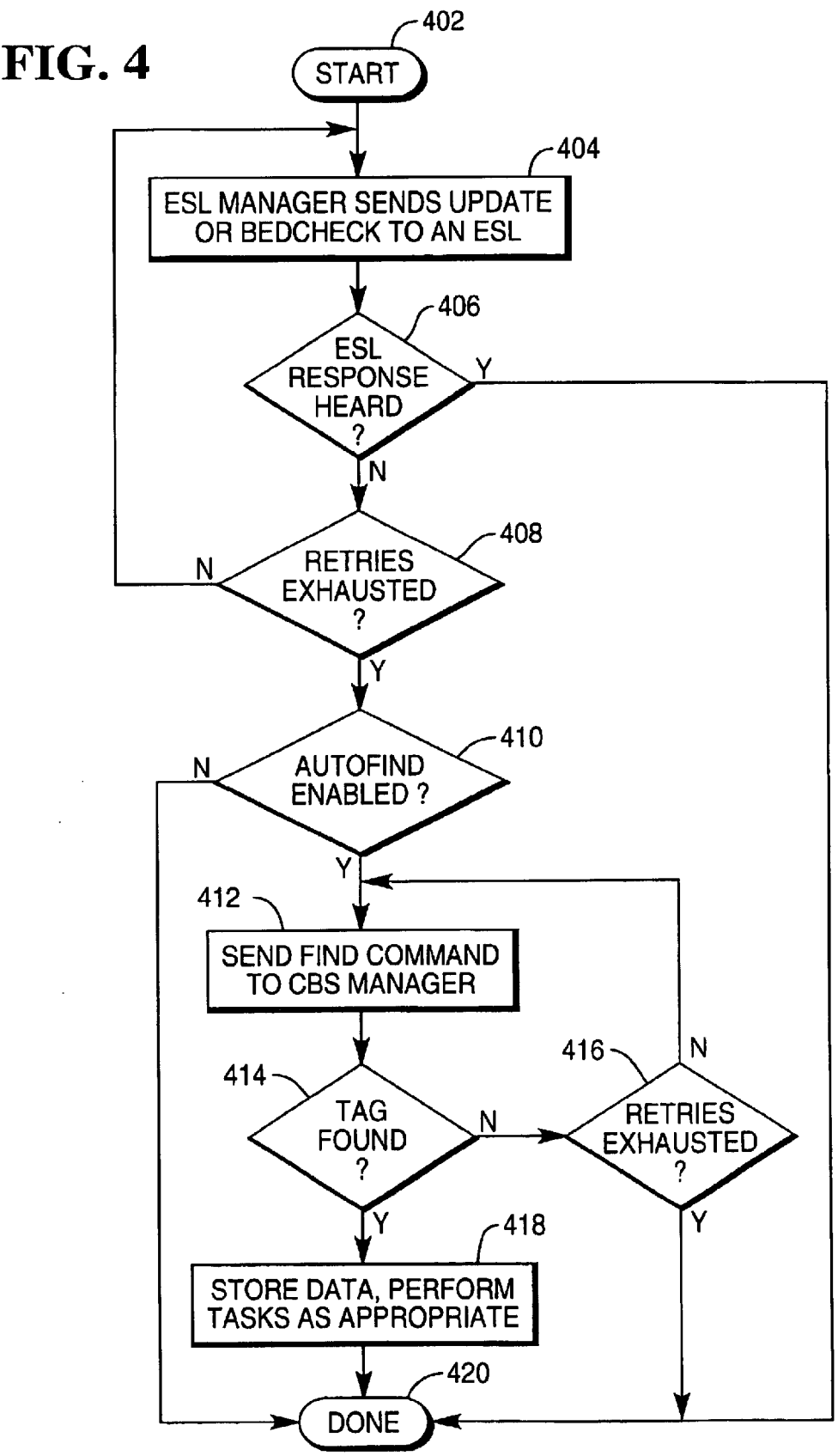
FIG. 4 shows a method of automatically finding an ESL in accordance with the present invention.

FIG. 4 shows a method 400 of automatically locating an ESL after the ESL fails to respond to a message. In step 402, the method 400 starts. In step 404, an ESL manager operating on a host computer system directs a CBS manager to send a message, such as a register update message or a bedcheck message, to the ESL. In step 406, the host computer system waits for a response to the message. In a preferred embodiment, a CBS manager informs the ESL manager of the response or lack of response. If a response is received, the method continues to step 420 and ends. If no response is received in step 406, the method continues to step 408. In step 408, the ESL manager increments a retry count and determines if the message has been retransmitted a predetermined number of times. If the message has not been retransmitted the predetermined number of times, the method returns to step 404. If the message has been retransmitted the predetermined number of times, the method continues to step 410. In step 410, the ESL manager determines if an automatic find option is enabled. If the automatic find option is not enabled, the method continues to step 420 and ends. If the automatic find option is enabled, the method continues to step 412. In step 412, the ESL manager causes the CBS manager to cause all of the CBSs in the retail establishment to issue a find command in all timeslots. The find command instructs the ESL to respond with an acknowledgment. Next, in step 414, the CBS manager waits for a response from the ESL. If no response is received, the method continues to step 416. In step 416, the ESL manager increments a second retry count and determines if the find command has been retransmitted a predetermined number of times. If the find command has not been retransmitted the predetermined number of times, the method returns to step 412. If the find command has been retransmitted a predetermined number of times, the method continues to step 420 and ends.

Returning to step 414, if a response to the find command is received by the CBS manager, the method continues to step 418. In step 418, the CBS manager informs the ESL manager which CBS or CBSs heard the response and on which timeslot. If multiple CBSs received the response, the CBS manager may also inform the ESL manager which CBS received the strongest signal. The ESL manager stores this information and then takes further appropriate action. Such further appropriate action, such as reassignment of the ESL to the closest CBS and appropriate timeslot, is described in further detail in U.S. patent application Ser. No. 10/044,688 entitled "Methods and Apparatus for Automatic Assignment of a Communication Base Station and Timeslot for an Electronic Shelf Label", filed on the same day as the present application and incorporated by reference herein in its entirety.

In one aspect of the invention, the CBS manager may also retry, or retransmit, the message or find multiple times before returning a response to the ESL manager.

In one aspect of the present invention, if the ESL does not respond to any messages transmitted to it, the host computer may log an error message to be received by a human operator.

Further details regarding the determination of the physical location of an ESL is disclosed in U.S. Pat. No. 5,818,346 which is incorporated by reference herein in its entirety.

It will be apparent to those skilled in the art that various modifications and variations can be made in the present invention without departing from the spirit and scope of the present invention. Thus, it is intended that the present invention cover the modifications and variations of this invention provided they come within the scope of the appended claims and their equivalents. For example, while a presently preferred embodiment utilizes an ESL to display informational text or price of an associated item, an ESL system may utilize ESLs in a variety of applications and environments without departing from the spirit and scope of the present invention.

We claim:

1. A communication method for an electronic shelf label (ESL) system utilizing frames divided into a plurality of timeslots, the method comprising the steps of:
    storing an assignment of one of the timeslots of the plurality of timeslots to an ESL in a host computer;
    transmitting a message to the ESL by the host computer, said message transmitted by one of a plurality of communication base stations (CBSs) on the assigned timeslots of a frame, each of the plurality of CBSs is assigned to one or more independent timeslots;
    waiting for a response to the message;
    if no response is received by the host computer, automatically transmitting a find message, said find message transmitted by each of the plurality of CBSs all of the plurality of timeslots of a frame;
    if a response to the find message is received, logging which CBS or CBSs received the response and logging the timeslot in which the response was received.

2. The method of claim 1 further comprising the step of:
    if no response to the find message is received, tallying an error message.

3. The method of claim 1 wherein the step of transmitting a message to the ESL by the host computer further comprises the substeps of:
    sending a command from an ESL manager software module to a CBS manager software module instructing the CBS manager software to transmit the message.

4. The method of claim 1 further comprising the step of:
if the response to the find message is received by more than one CBS, identifying the CBS which received the response with the strongest signal strength.

5. The method of claim 1 wherein the ESL is assigned to communicate utilizing only one of the plurality of CBSs.

6. The method of claim 5 wherein the ESL does not respond to the message due to the ESL being outside the transmission range of the ESL's assigned CBS.

7. The method of claim 1 wherein each frame comprises 24 timeslots.

8. An electronic shelf label (ESL) system comprising:
an ESL for displaying information;
a plurality of communication base stations (CBSs) communicatively connected to a host computer;
a host computer for initiating transmission of a message to the ESL, said message transmitted by one of the plurality of communication base stations (CBSs) utilizing one timeslots of a frame, said host computer storing an assignment of one of the timeslots of the plurality of timeslots to the ESL, each of the plurality of CBSs is assigned to one or more timeslots, said host computer waiting for a response to the message and if no response is received by the host computer, automatically transmitting an automatic find message, said find message transmitted by each of the plurality of CBSs on all of the timeslots of a frame, and if a response to the find message is received, logging which CBS or CBSs received the response and logging the timeslot in which the response was received.

9. The system of claim 8 wherein the host computer tallys an error message if no response to the find message is received.

10. The system of claim 8 wherein the host computer comprises an ESL manager software module and a CBS software module, and the host computer sends a command from an ESL manager software module to a CBS manager software module instructing the CBS manager software to transmit the message.

11. The system of claim 8 wherein, if the response to the find message is received by more than one CBS, the host computer identifies the CBS which received the response with the strongest signal strength.

12. The system of claim 8 wherein the ESL is assigned to communicate utilizing only one of the plurality of timeslots of a frame.

13. The system of claim 12 wherein the ESL is assigned to communicate utilizing only one of the plurality of CBSs.

14. The system of claim 13 wherein the ESL does not respond to the message due to the ESL being outside the transmission range of the ESL's assigned CBS.

15. The system of claim 8 wherein each frame comprises 24 timeslots.

16. An electronic shelf label (ESL) system comprising:
a plurality of groups of ESLs for displaying information,
a plurality of communication base stations (CBSs) communicatively connected to a host computer, each of the groups of ESLs assigned to one of the CBSs, each CBS is assigned to one or more timeslots;
a host computer for initiating transmission of a message to one of the ESLs, said host computer storing an assignment of a timeslot to each ESL, said message transmitted by the CBS assigned to the ESL utilizing one timeslots of a frame, said host computer waiting for a response to the message and if no response is received by the host computer, automatically transmitting a find message, said find message transmitted by each of the plurality of CBSs on all of the timeslots of a frame, and if a response to the find message is received, logging which CBS or CBSs received the response and logging the timeslot in which the response was received.

17. The system of claim 16 wherein the host computer tallys an error message if no response to the find message is received.

18. The system of claim 16 wherein the host computer comprises an ESL manager software module and a CBS software module, and the host computer sends a command from an ESL manager software module to a CBS manager software module instructing the CBS manager software to transmit the message.

19. The system of claim 16 wherein, if the response to the find message is received by more than one CBS, the host computer identifies the CBS which received the response with the strongest signal strength.

20. The communication method of claim 1 wherein the logging step further comprises reassigning the ESL to the logged timeslot in which the response was received.

* * * * *